US011381792B2

(12) United States Patent
Peng et al.

(10) Patent No.: US 11,381,792 B2
(45) Date of Patent: Jul. 5, 2022

(54) PROJECTION SYSTEM AND POSITIONING METHOD APPLIED TO PROJECTION SYSTEM

(71) Applicant: Coretronic Corporation, Hsin-Chu (TW)

(72) Inventors: Chien-Chun Peng, Hsin-Chu (TW); Hsun-Cheng Tu, Hsin-Chu (TW); Chi-Wei Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/204,915

(22) Filed: Mar. 17, 2021

(65) Prior Publication Data

US 2021/0297643 A1    Sep. 23, 2021

(30) Foreign Application Priority Data

Mar. 18, 2020   (CN) .......................... 202010189439.9

(51) Int. Cl.
*H04N 9/31*        (2006.01)

(52) U.S. Cl.
CPC ......... *H04N 9/3185* (2013.01); *H04N 9/3147* (2013.01); *H04N 9/3188* (2013.01)

(58) Field of Classification Search
CPC .. H04N 9/3185; H04N 9/3147; H04N 9/3188; H04N 9/3182; H04N 9/3194
See application file for complete search history.

(56) References Cited

U.S. PATENT DOCUMENTS

| 7,143,948 | B2 * | 12/2006 | Nakazawa | G06K 7/14 |
| | | | | 235/462.1 |
| 9,438,872 | B2 | 9/2016 | Lin et al. | |
| 10,326,968 | B2 * | 6/2019 | Iversen | H04N 13/327 |
| 10,893,246 | B2 * | 1/2021 | Lin | H04N 9/3147 |
| 11,151,698 | B2 * | 10/2021 | Suzuki | G06T 5/20 |
| 2007/0206204 | A1 * | 9/2007 | Jia | G01B 11/2527 |
| | | | | 356/604 |

(Continued)

FOREIGN PATENT DOCUMENTS

| CN | 100428136 | 10/2008 |
| CN | 102508397 | 6/2012 |

(Continued)

*Primary Examiner* — Paulos M Natnael
(74) *Attorney, Agent, or Firm* — JCIPRNET

(57) ABSTRACT

A projection system and a positioning method capable of positioning a projected image are provided. The projection system includes a projection device, an image capturing device, and a determination module. The projection device projects a plurality of display grid points. The image capturing device captures images of the plurality of display grid points to obtain a plurality of display results corresponding to the plurality of display grid points. The determination module receives the plurality of display results. The determination module controls the projection device not to project at least one unrecognizable display grid point corresponding to the at least one unrecognizable display result when determining that the plurality of display results include the at least one unrecognizable display result. The invention is provided to improve the accuracy of matching or stitching of a projected image.

15 Claims, 7 Drawing Sheets

(56) References Cited

U.S. PATENT DOCUMENTS

| | | | | |
|---|---|---|---|---|
| 2010/0201894 A1* | 8/2010 | Nakayama | ............ | H04N 9/3185 |
| | | | | 348/745 |
| 2012/0050698 A1* | 3/2012 | Kotani | ................. | H04N 9/3194 |
| | | | | 353/94 |
| 2016/0089026 A1* | 3/2016 | Heeren | .............. | G02B 21/0012 |
| | | | | 351/207 |
| 2019/0146313 A1* | 5/2019 | De La Cruz | ......... | H04N 9/3194 |
| | | | | 345/581 |
| 2020/0280706 A1* | 9/2020 | Tu | ........................ | H04N 9/3185 |
| 2020/0413015 A1* | 12/2020 | Asai | ..................... | H04N 9/3185 |

FOREIGN PATENT DOCUMENTS

| | | |
|---|---|---|
| CN | 108828879 | 11/2018 |
| TW | 200641450 | 12/2006 |
| TW | 200722897 | 6/2007 |
| TW | 201916677 | 4/2019 |

\* cited by examiner

PROJECTION SYSTEM AND POSITIONING METHOD APPLIED TO PROJECTION SYSTEM

CROSS-REFERENCE TO RELATED APPLICATION

This application claims the priority benefit of China application serial no. 202010189439.9, filed on Mar. 18, 2020. The entirety of the above-mentioned patent application is hereby incorporated by reference herein and made a part of this specification.

BACKGROUND OF THE INVENTION

1. Field of the Invention

The invention relates to a projection system and a positioning method applied to a projection system, and in particular, to a projection system and a positioning method that are capable of positioning a projected image.

2. Description of Related Art

A projection system may be used to perform positioning. The projection system may project a positioning image on a projection screen and positions the positioning image and the projection screen, thus enabling an image projected by the projection system to match a projection surface. In some cases regarding positioning, when a plurality of projectors are integrated into a projection system, the projection system may still position a plurality of positioning images projected by the plurality of projectors, so that a complete and large-area image may be stitched.

However, when a camera captures a positioning image for positioning, the brightness in the positioning image may be inconsistent. Such a situation causes the brightness in some regions of the positioning image to be excessively high, so that the projection system is prevented from performing recognition, and the result of the positioning is thus affected. For example, when the projection system is applied to rear-projection or home theaters, the projection system uses a short-focus projector. The short-focus projector tends to produce unrecognizable display results with high brightness (i.e., solar effect) on a projection position corresponding to a shortest projection distance on the projection screen. The unrecognizable display results may be, for example, high-brightness glare. The projection system cannot recognize the above unrecognizable display results, resulting in mismatching or mis-stitching of the projected image.

The information disclosed in this BACKGROUND OF THE INVENTION section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a projection system and a positioning method configured for improving accuracy of matching or stitching of a projected image.

Other objectives and advantages of the invention can be further understood from the technical features disclosed in the invention.

To achieve one or some or all of the above objectives or other objectives, a projection system is provided in an embodiment of the invention. The projection system includes a projection device, an image capturing device, and a determination module. The projection device is configured to project a plurality of display grid points. The image capturing device is configured to capture images of the plurality of display grid points to obtain a plurality of display results corresponding to the plurality of display grid points. The determination module is coupled to the projection device and the image capturing device. The determination module is configured to receive the plurality of display results, and determine whether the plurality of display results include at least one unrecognizable display result with excessive brightness. The determination module controls the projection device not to project at least one unrecognizable display grid point corresponding to the at least one unrecognizable display result when determining that the plurality of display results include the at least one unrecognizable display result.

To achieve one or some or all of the above objectives or other objectives, a positioning method is provided in an embodiment of the invention. The positioning method is applied to a projection system. The projection system includes a projection device and an image capturing device. The positioning method includes the following steps. A plurality of display grid points are projected by the projection device. Images of the plurality of display grid points are captured to obtain a plurality of display results corresponding to the plurality of display grid points by the image capturing device. Whether the plurality of display results include at least one unrecognizable display result with excessive brightness is determined, and the projection device is controlled not to project at least one unrecognizable display grid point corresponding to the at least one unrecognizable display result when the plurality of display results are determined to include the at least one unrecognizable display result.

To achieve one or some or all of the above objectives or other objectives, a projection system is provided in an embodiment of the invention. The projection system includes a projection device configured to project a plurality of display grid points. The projection device includes an image capturing device and a determination module. The image capturing device is configured to capture images of the plurality of display grid points to obtain a plurality of display results corresponding to the plurality of display grid points. The determination module is electrically coupled to the image capturing device. The determination module is configured to receive the plurality of display results, and determine whether the plurality of display results include at least one unrecognizable display result with excessive brightness. The determination module controls the projection device not to project at least one unrecognizable display grid point corresponding to the at least one unrecognizable display result when determining that the plurality of display results include the at least one unrecognizable display result.

Based on the above, embodiments of the invention include at least one of the following advantages or effects. According to the projection system and the positioning method, a plurality of display grid points are projected to obtain a plurality of display results, and whether the plurality of display results include at least one unrecognizable display result with excessive brightness is determined. When the plurality of display results are determined to include the at least one unrecognizable display result, according to the projection system and the positioning method, at least one unrecognizable grid point corresponding to the at least one unrecognizable display result is not projected. In this way, the accuracy of matching or stitching of the projected image by the projection system is improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
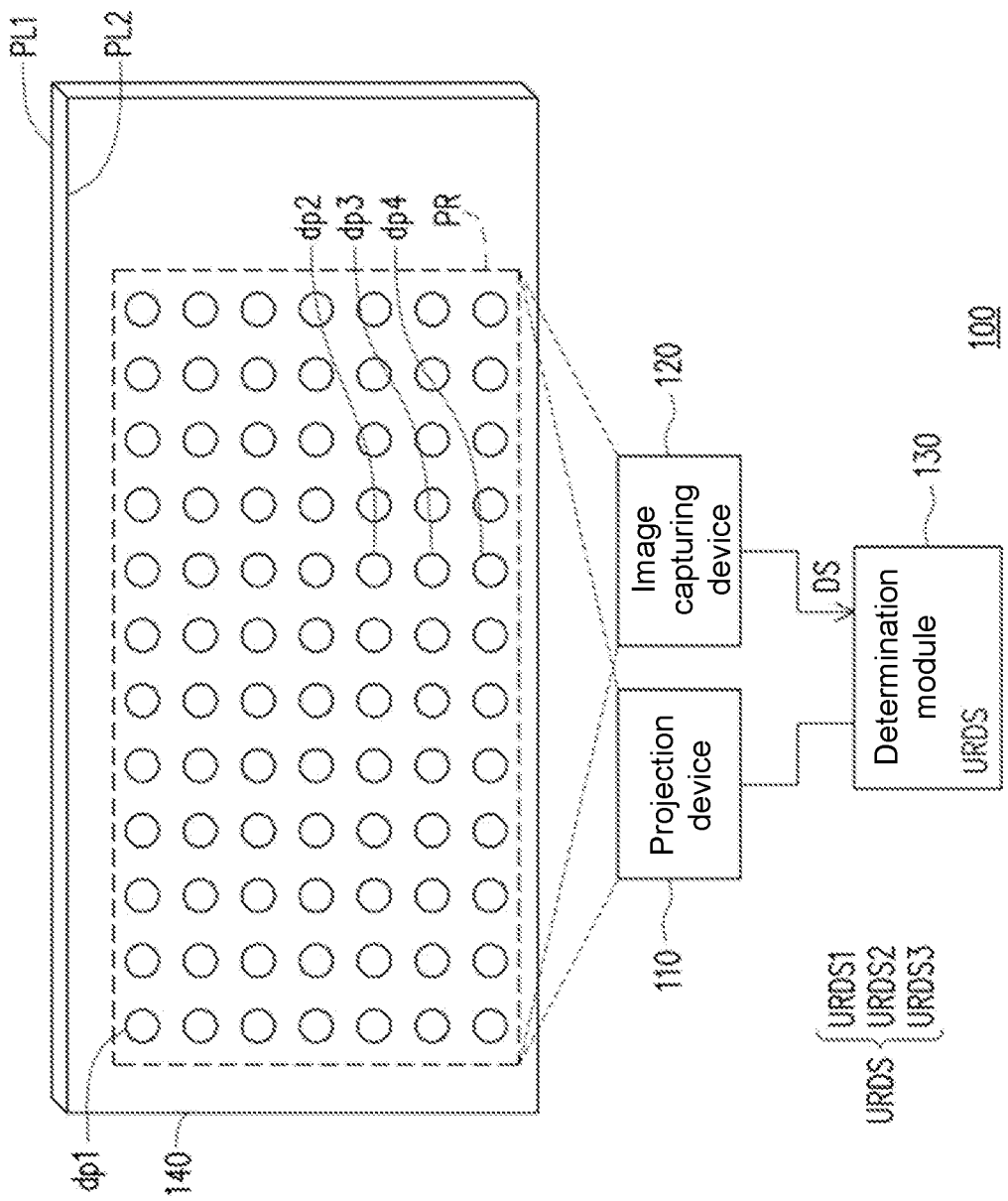
FIG. 1 is a schematic diagram illustrating a projection system according to a first embodiment of the invention.

Referring to FIG. 1, FIG. 1 is a schematic diagram illustrating a projection system according to a first embodiment of the invention. In the present embodiment, a projection system 100 includes a projection device 110, an image capturing device 120, and a determination module 130. In the present embodiment, the determination module 130 controls and transmits image data to the projection device 110. The projection device 110 is, for example, a projector.

The projection device 110 projects images. The projection device 110 projects images including a plurality of display grid points. The plurality of display grid points may form a projection range PR. The plurality of display grid points are candidate positioning points for the projection system 100 to match or stitch a projected image. Image information of the candidate positioning points are stored in, for example, a storage unit of the determination module 130, which is not limited thereto, and may also be stored in a storage unit of the projection device 110. The plurality of display grid points in the present embodiment are presented in circles respectively (e.g., a single display grid point dp1). The number, the shape, the color, and the size of the display grid points in the invention are not limited to the present embodiment. In the present embodiment, the image capturing device 120 captures images of the plurality of display grid points to obtain a plurality of display results DS corresponding to the plurality of display grid points to transmit the display results to the determination module 130. Specifically, the display results DS are captured images captured by the image capturing device 120. The image capturing device 120 of the present embodiment may be a camera, a video camera, or other devices.

Due to difference distances from the plurality of display grid points in the PR to the image capturing device 120, the captured images (display results DS) captured by the image capturing device 120 are exposed to different degrees so that positions of some display grid points cannot be determined.

In the present embodiment, the determination module 130 is coupled to the projection device 110 and the image capturing device 120. The determination module 130 receives the display results obtained by the image capturing device 120, and determines whether the display results DS include an unrecognizable display result with excessive brightness. It is worth mentioning that the unrecognizable display result with excessive brightness refers to a display result DS (captured image) caused by overexposure. When determining that the display results DS include at least one unrecognizable display result URDS, the determination module 130 controls the projection device 110 not to project an unrecognizable grid point corresponding to the unrecognizable display result URDS. In the present embodiment, the unrecognizable display result URDS reflects display grid points with excessive brightness and adjacent display grid points covered by halos generated by the display grid points with excessive brightness. Therefore, the determination module 130 indicates the display grid points with excessive brightness and the adjacent display grid points covered by halos generated by the display grid points with excessive brightness as unrecognizable grid points.

For example, the plurality of display results DS include unrecognizable display results URDS, and the unrecognizable display results URDS include a first unrecognizable display result URDS1, a second unrecognizable display result URDS2, and a third unrecognizable display result URDS3. In FIG. 1, for example, since display grid points dp2-dp4 are too bright, the display grid points dp2-dp4 cannot be recognized as display grid points independent of each other. Therefore, the display grid points dp2-dp4 are not suitable display grid points as candidate positioning points for matching or stitching. The first unrecognizable display result URDS1 indicates that the display grid point dp2 is an unrecognizable grid. The second unrecognizable display result URDS2 indicates that the display grid point dp3 is an unrecognizable grid. The third unrecognizable display result URDS3 indicates that the display grid point dp4 is an unrecognizable grid. The determination module 130 controls the projection device 110 not to project the display grid point dp2 corresponding to the first unrecognizable display result URDS1, not to project the display grid point dp3 corresponding to the second unrecognizable display result URDS2, and not to project the display grid point dp4 corresponding to the third unrecognizable display result URDS3. In the case that the projection device 110 does not project the display grid points dp2-dp4, the remaining display grid points are display grid points recognizable by the determination module 130. In this way, the accuracy of matching or stitching of the projected image by the projection system 100 can be improved.

The determination module 130 of the present embodiment may be, for example, a central processing unit (CPU), or another programmable general-purpose or special-purpose microprocessor, a digital signal processor (DSP), a programmable controller, an application specific integrated circuit (ASIC), a programmable logic device (PLD) or other similar elements, or a combination thereof, which can load and execute a computer program.

In the present embodiment, the projection system 100 further includes a projection screen 140. The projection screen 140 includes a viewing surface PL1 and a projection surface PL2 opposite to the viewing surface PL1. The projection device 110 projects a plurality of display grid points on the projection surface PL2. The image capturing device 120 obtains display results DS on the projection surface PL2. Therefore, the projection system 100 may be a rear-projection system. In the present embodiment, the projection device 110 and the image capturing device 120 are co-located on the same side of the projection screen 140. Viewers are located on the same side of the viewing surface PL1 of the projection screen 140.

In some embodiments, the viewing surface may be the projection surface PL2. The projection device 110, the image capturing device 120, and the viewers may be co-located on the same side of the projection screen 140. Therefore, the projection system 100 may be designed as a front-projection system.

Figure 2:
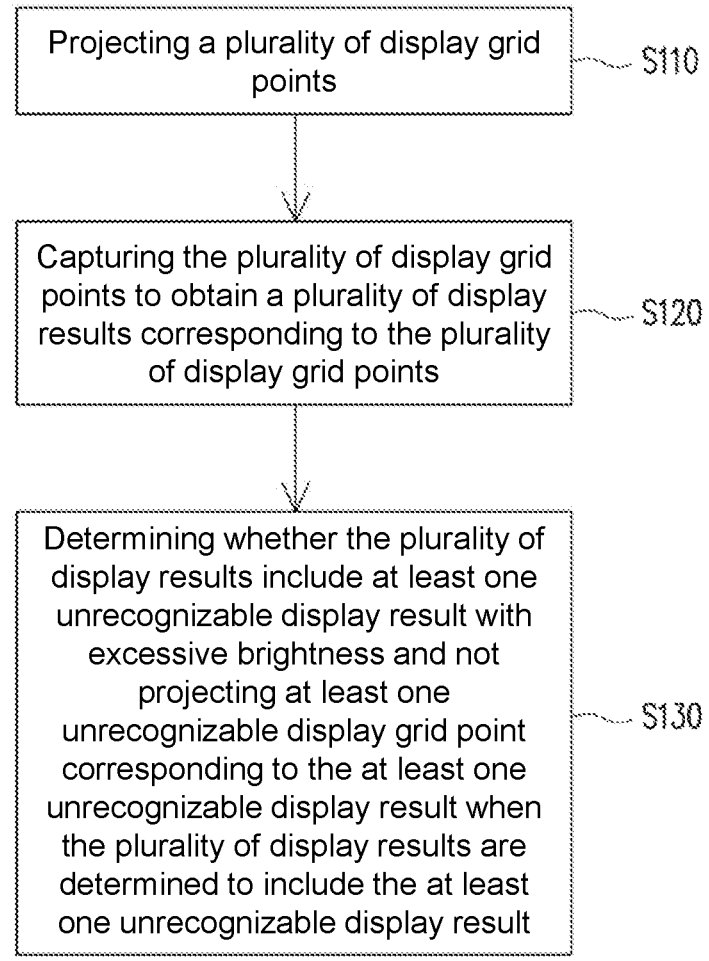
FIG. 2 is an operation flow chart illustrating a positioning method according to the first embodiment of the invention.

Referring to FIG. 1 and FIG. 2 together, FIG. 2 is an operation flow chart illustrating a positioning method according to the first embodiment of the invention. The positioning method of the present embodiment may be performed when the projection system 100 is started, before the projection system 100 begins to play a video signal, or when the projection system 100 is awakened from a standby mode. In the present embodiment, the positioning method is applied to the projection system 100. The projection system 100 projects a plurality of display grid points through the projection device 110 in step S110. Then, the projection system 100 captures the plurality of display grid points through the image capturing device 120 to obtain display results DS corresponding to the plurality of display grid points in step S120. The projection system 100 determines whether the display results DS include at least one unrecognizable display result with excessive brightness in step S130. The projection system 100 does not project at least one unrecognizable display grid point corresponding to the at least one unrecognizable display result when determining that the plurality of display results DS include the at least one unrecognizable display result.

Figure 3A:
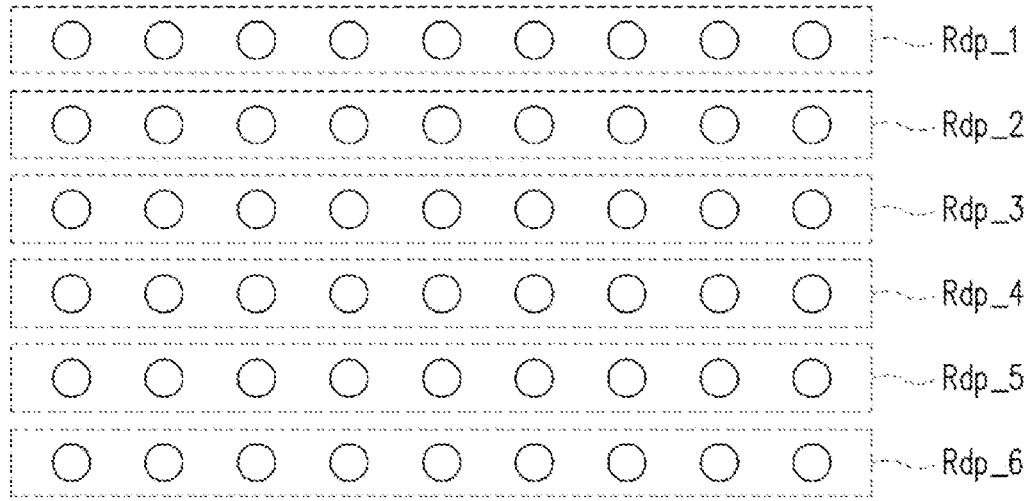
FIG. 3A is a schematic operation diagram illustrating steps S110 and S120 in a positioning method according to the invention.

An example is provided for illustration herein. Referring to FIG. 1, FIG. 2, and FIG. 3A together, FIG. 3A is a schematic operation diagram illustrating steps S110 and S120 in a positioning method according to the invention. In step S110 of the present embodiment, the plurality of display grid points are divided into display grid point rows Rdp_1-Rdp_6. The projection device 110 projects the display grid point rows Rdp_1-Rdp_6 sequentially. When the projection device 110 projects the display grid point row Rdp_1 in step S110, the image capturing device 120 captures a plurality of display grid points in the display grid point row Rdp_1 to obtain display results corresponding to the plurality of display grid points in the display grid point row Rdp_1 in step S120. The determination module 130 determines whether the display results corresponding to the display grid point row Rdp_1 include an unrecognizable display result corresponding to the display grid point row Rdp_1. In addition to this, the determination module 130 may further determine recognizable display results in the plurality of display results. The recognizable display results may indicate that corresponding display grid points are of appropriate brightness. When the projection device 110 projects the display grid point row Rdp_2 in step S110, the image capturing device 120 captures a plurality of display grid points in the display grid point row Rdp_2 to obtain display results corresponding to the display grid points in the display grid point row Rdp_2 in step S120. The determination module 130 determines whether the display results corresponding to the display grid point row Rdp_2 include an unrecognizable display result corresponding to the display grid point row Rdp_2. The rest may be deduced by analogy. The image capturing device 120 can capture the display grid point rows Rdp_1-Rdp_6 sequentially to obtain display results DS corresponding to the display grid points. Therefore, the determination module 130 determines whether the display results DS of the display grid points in the display grid point rows Rdp_1-Rdp_6 include an unrecognizable display result URDS. In the present embodiment, the projection device 110 may preferentially project any of the display grid point rows Rdp_1-Rdp_6, but is not limited thereto. In some embodiments, the projection device 110 projects at least two of the display grid point rows Rdp_1-Rdp_6 at one time, and the image capturing device 120 can capture the at least two of the display grid point rows Rdp_1-Rdp_6 at one time to obtain display results DS corresponding to the display grid points. The running time of steps S210 and S220 is shortened accordingly.

Figure 3B:
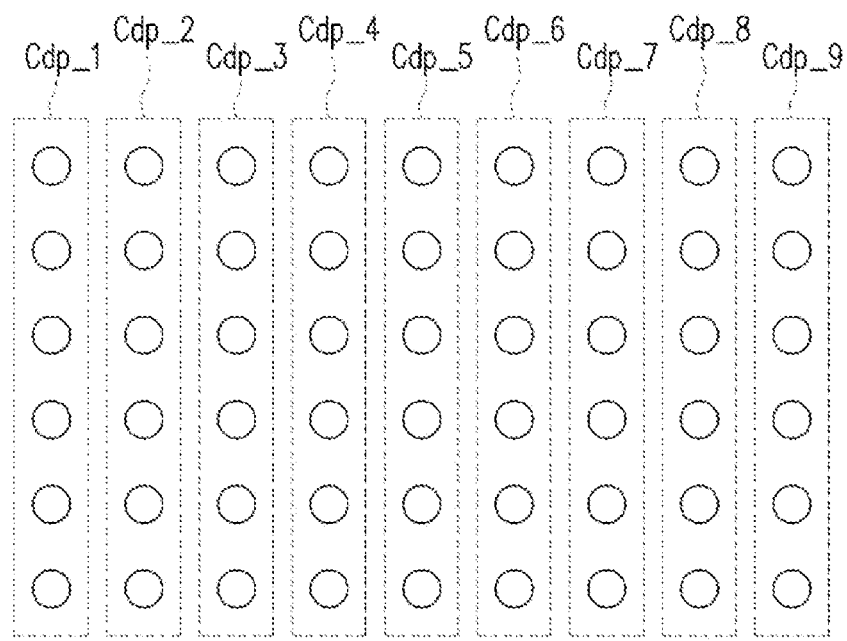
FIG. 3B is another schematic operation diagram illustrating steps S110 and S120 in the positioning method according to the invention.

Another example is provided for illustration herein. Referring to FIG. 1, FIG. 2, and FIG. 3B together, FIG. 3B is another schematic operation diagram illustrating steps S210 and S220 in the positioning method according to the invention. In step S210 of the present embodiment, the plurality of display grid points are divided into display grid point columns Cdp_1-Cdp_9. The projection device 110 may project the display grid point columns Cdp_1-Cdp_9 sequentially. When the projection device 110 projects the display grid point column Cdp_1 in step S110, the image capturing device 120 captures a plurality of display grid points in the display grid point column Cdp_1 to obtain display results corresponding to the plurality of display grid points in the display grid point column Cdp_1 in step S120. The determination module 130 determines whether the display results corresponding to the display grid point column Cdp_1 include an unrecognizable display result corresponding to the display grid point column Cdp_1. When the projection device 110 projects the display grid point column Cdp_2 in step S110, the image capturing device 120 captures a plurality of display grid points in the display grid point column Cdp_2 to obtain display results corresponding to the display grid points in the display grid point column Cdp_2 in step S120. The determination module 130 determines whether the display results corresponding to the display grid point column Cdp_2 include an unrecognizable display result corresponding to the display grid point column Cdp_2. The rest may be deduced by analogy. The image capturing device 120 can capture the display grid point columns Cdp_1-Cdp_9 sequentially to obtain display results DS corresponding to the display grid points. Therefore, the determination module 130 determines whether the display results DS of the display grid points in the display grid point columns Cdp_1-Cdp_9 include an unrecognizable display result URDS. The projection device 110 may preferentially project any of the display grid point columns Cdp_1-Cdp_9, but is not limited thereto. In some embodiments, the projection device 110 projects at least two of the display grid point columns Cdp_1-Cdp_9 at one time, and the image capturing device 120 can capture the at least two of the display grid point columns Cdp_1-Cdp_9 at one time to obtain display results DS corresponding to the display grid points. The running time of steps S210 and S220 is shortened accordingly.

In some embodiments, the projection device 110 projects the display grid point rows Rdp_1-Rdp_6 sequentially (e.g., FIG. 3A), and projects the display grid point columns Cdp_1-Cdp_10 sequentially (e.g., FIG. 3B). The image capturing device 120 captures the display grid point rows Rdp_1-Rdp_6 sequentially and captures the display grid point columns Cdp_1-Cdp_10 sequentially, so as to obtain display results DS corresponding to the display grid points.

Referring to the embodiment in FIG. 1 and FIG. 2 again, in step S130 of the present embodiment, when determining that the display results DS of the display grid points include the at least one unrecognizable display result URDS, the determination module 130 controls the projection device 110 not to project at least one unrecognizable grid point corresponding to the at least one unrecognizable display result.

Figure 4:
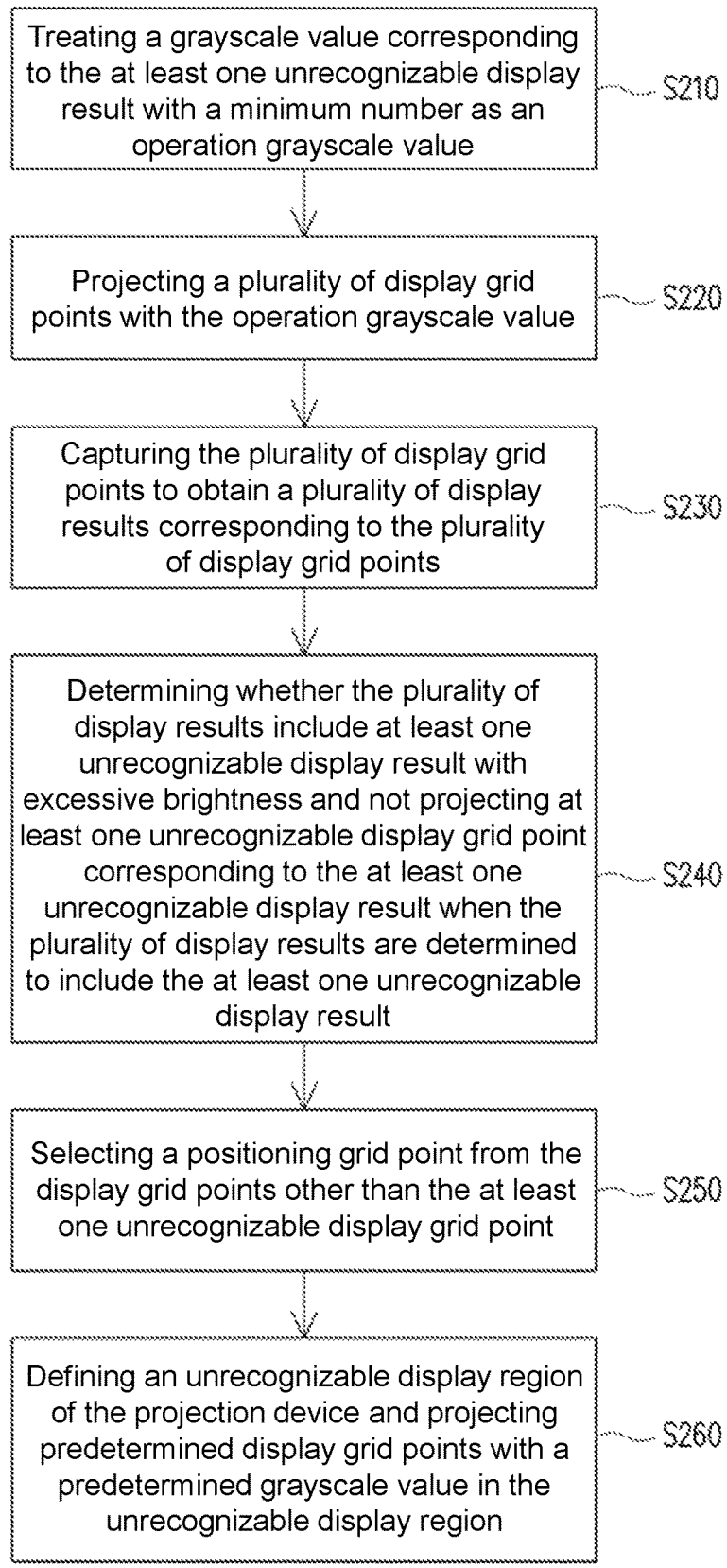
FIG. 4 is an operation flow chart illustrating another positioning method according to the first embodiment of the invention.

Referring to FIG. 1 and FIG. 4, FIG. 4 is an operation flow chart illustrating another positioning method according to the first embodiment of the invention. In S210 of the present embodiment, the projection system 100 treats a grayscale value corresponding to the at least one unrecognizable display result URDS with a minimum number as an operation grayscale value.

Further, in the present embodiment, when the projection system 100 is started, the projection device 110 adjusts grayscale values of the display grid points and projects the plurality of display grid points. When determining the at least one unrecognizable display result URDS with a minimum number, the determination module 130 treats a grayscale value corresponding to the at least one unrecognizable display result URDS with the minimum number as the operation grayscale value. For example, at a first time point, the projection device 110 projects a plurality of display grid points by using a first grayscale value. The image capturing device 120 obtains first grayscale value display results corresponding to the plurality of display grid points with the first grayscale value. The determination module 130 obtains a number of unrecognizable display results in the first grayscale value display results. At a time point later than the first time point, the projection device 110 projects a plurality of display grid points by using a second grayscale value. The first grayscale value is greater than the second grayscale value. The image capturing device 120 obtains second grayscale value display results corresponding to the plurality of display grid points with the second grayscale value. The determination module 130 obtains a number of unrecognizable display results in the second grayscale value display results. At a third time point later than the second time point, the projection device 110 projects a plurality of display grid points by using a third grayscale value. The second grayscale value is greater than the third grayscale value. The image capturing device 120 obtains third grayscale value display results corresponding to the plurality of display grid points with the third grayscale value. The determination module 130 obtains a number of unrecognizable display results in the third grayscale value display results. The rest may be deduced by analogy. The determination module 130 treats the grayscale value corresponding to the unrecognizable display results with the minimum number as the operation grayscale value.

The projection system 100 projects a plurality of display grid points with the operation grayscale value through the projection device 110 in step S220. Therefore, the projection device 110 projects a minimum number of unrecognizable display grid points based on the operation grayscale value.

Implementation details of steps S230 and S240 can be sufficiently taught from steps S120 and S130 in the embodiment of FIG. 1 and FIG. 2, and thus, descriptions thereof are omitted herein.

In step S250, the projection system 100 selects a positioning grid point from the display grid points other than the at least one unrecognizable display grid point through the determination module 130. The positioning grid point may position a projection range PR or position of the projection device 110.

Figure 5:
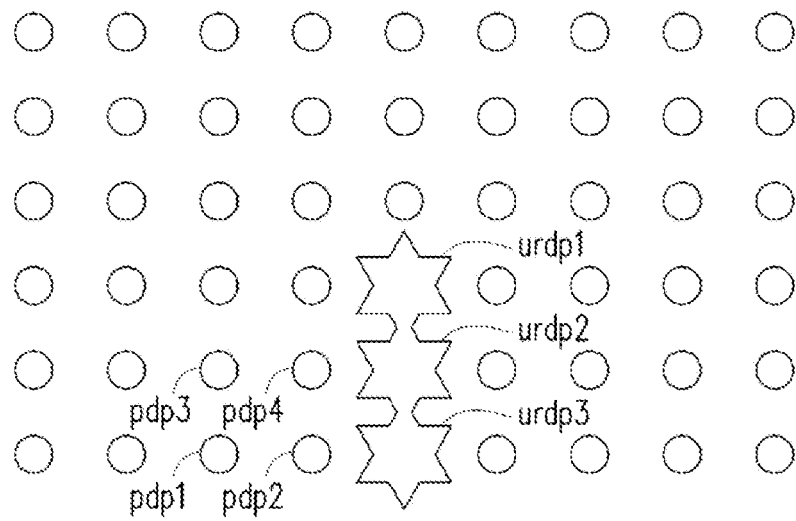
FIG. 5 is a schematic diagram illustrating formation of positioning grid points according to step S250.

Further, referring to FIG. 1, FIG. 4, and FIG. 5 together, FIG. 5 is a schematic diagram illustrating formation of positioning grid points according to step W250. In the present embodiment, the determination module 130 determines unrecognizable display grid points urdp1-urdp3 and selects positioning grid points pdp1-pdp4 from the display grid points other than the unrecognizable display grid points urdp1-urdp3. For example, a number of the positioning grid points in the present embodiment is 4. There may be one or more positioning grid points in the invention. The number and the position of the positioning grid points in the invention are not limited to the present embodiment.

Referring to the embodiment of FIG. 1 and FIG. 5 again, in step S260 of the present embodiment, the projection system 100 defines an unrecognizable display region of the projection device 110 according to the unrecognizable display result URDS through the determination module 130, and controls the projection device 110 to project predetermined display grid points with a predetermined grayscale value in the unrecognizable display region. In the present embodiment, the predetermined grayscale value is less than the operation grayscale value.

Figure 6:
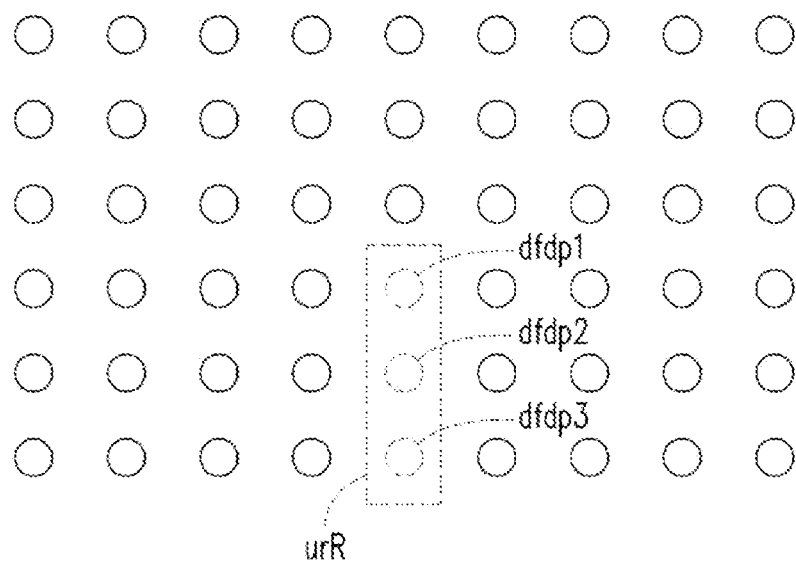
FIG. 6 is a schematic diagram illustrating formation of an unrecognizable display region and predetermined display grid points according to step S260.

Further, referring to FIG. 1, FIG. 4, and FIG. 6 together, FIG. 6 is a schematic diagram illustrating formation of an unrecognizable display region and predetermined display grid points according to step S260. In the present embodiment, the determination module 130 defines, after determining at least one unrecognizable display grid point (the unrecognizable display grid points urdp1-urdp3 as shown in FIG. 5), an unrecognizable display region urR of the projection device 110 according to the position where the at least one unrecognizable display grid point is present. The unrecognizable display region urR is used to indicate a region where the unrecognizable display grid points (the unrecognizable display grid points urdp1-urdp3 as shown in FIG. 5) with the operation grayscale value projected by the projection device 110 are present. Next, the determination module 130 projects predetermined display grid points dfdp1-dfdp3 with a predetermined grayscale value in the unrecognizable display region urR. In the present embodiment, positions of the predetermined display grid points dfdp1-dfdp3 may be generated according to spacing between adjacent display grid points in the PR. In the present embodiment, the predetermined display grid points dfdp1-dfdp3 may be generated by interpolation. The interpolation is a common calculation method for a person skilled in the art.

Figure 7:
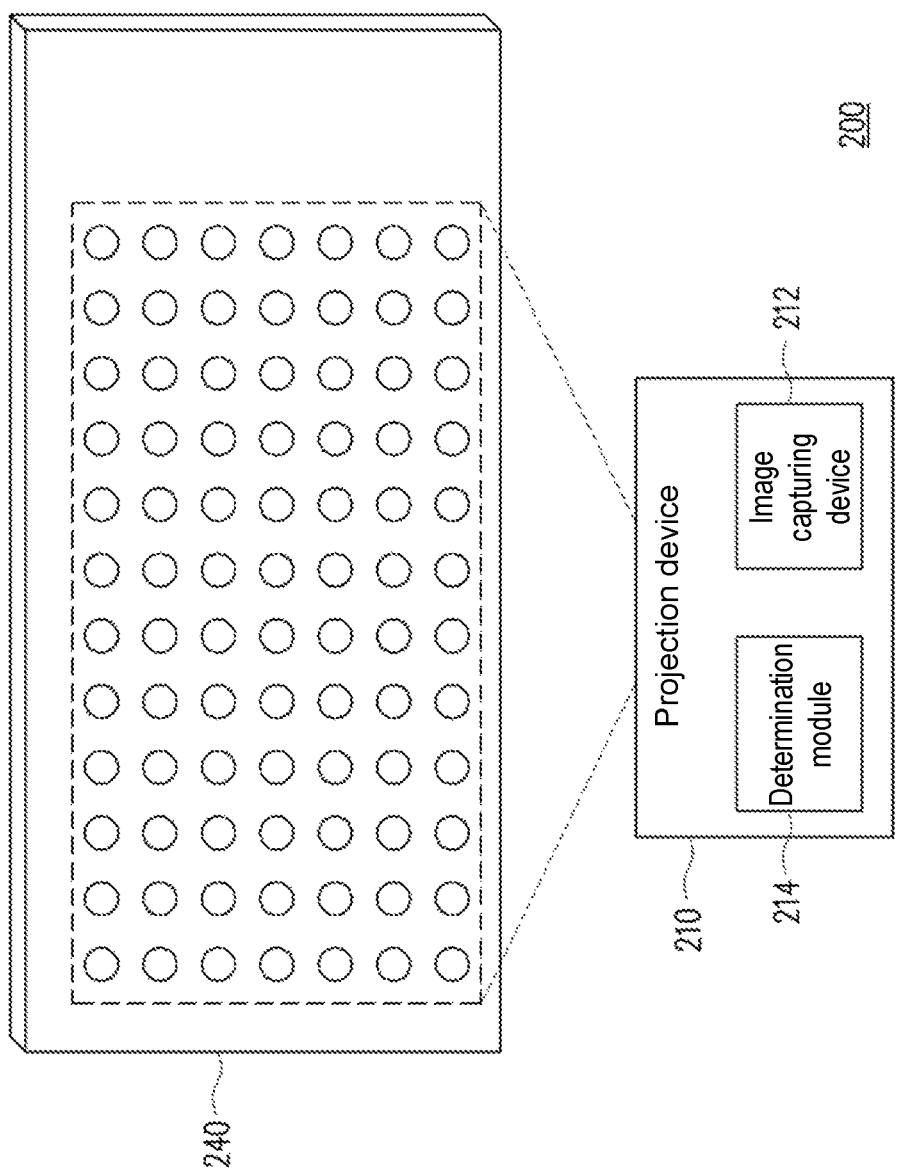
FIG. 7 illustrates a projection system according to a second embodiment of the invention.

Referring to FIG. 7, FIG. 7 illustrates a projection system according to a second embodiment of the invention. The present embodiment is different from the first embodiment in that a projection system 200 in the present embodiment includes a projection device 210. The projection device 210 includes an image capturing device 212 and a determination module 214. That is, the image capturing device 212 and the determination module 214 are disposed in the projection device 210. Implementation details of the projection device 210, the image capturing device 212, and the determination module 214 can be sufficiently taught from FIG. 1 to FIG. 6, and thus descriptions thereof are omitted herein. Through the positioning method as in FIG. 2 or FIG. 4, the projection system 200 can improve the accuracy of matching between an image projected by the projection device 210 and a projection screen 240.

Figure 8:
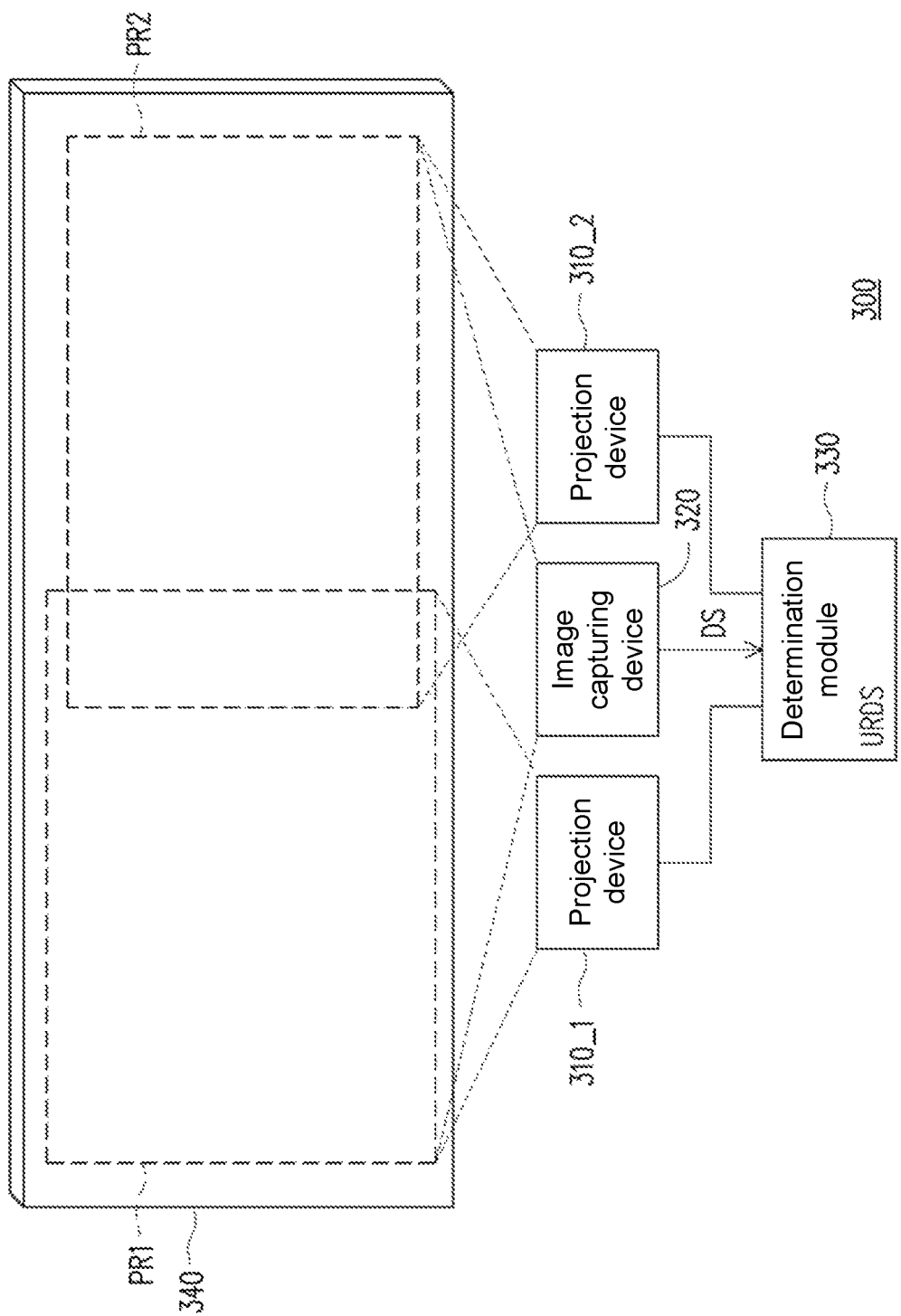
FIG. 8 illustrates a projection system according to a third embodiment of the invention.

Referring to FIG. 8, FIG. 8 illustrates a projection system according to a third embodiment of the invention. A projection system 300 includes a plurality of projection devices. The projection system 300 of the present embodiment includes two projection devices 310_1 and 310_2, an image capturing device 320, and a determination module 330. A plurality of display grid points (not shown) projected by the projection device 310_1 may form a projection range PR1. A plurality of display grid points (not shown) projected by the projection device 310_2 may form a projection range PR2. The image capturing device 320 may capture the plurality of display grid points to obtain a plurality of display results DS corresponding to the plurality of display grid points. The determination module 330 is coupled to the projection devices 310_1 and 310_2 and the image capturing device 320. The determination module 330 receives the display results DS obtained by the image capturing device 320 and determines whether the display results DS include an unrecognizable display result URDS with excessive brightness. When determining that the display results DS include at least one unrecognizable display result URDS, the determination module 330 controls the projection devices 310_1 and 310_2 not to project an unrecognizable grid point corresponding to the at least one unrecognizable display result URDS. The projection system 300 can improve the accuracy of stitching of an image projected by the projection device 310_1 and an image projected by the projection device 310_2, and improve the accuracy of matching between the images projected by the projection devices 310_1 and 310_2 and the projection screen 340. Based on the above, the embodiments of the invention include at least one of the following advantages or effects. According to the invention, the plurality of display grid points are projected to obtain the plurality of display results, and whether the plurality of display results include the at least one unrecognizable display result with excessive brightness is determined. When the plurality of display results are determined to include the at least one unrecognizable display result, according to the invention, the at least one unrecognizable grid point corresponding to the at least one unrecognizable display result is not projected. In this way, the accuracy of matching or stitching of the projected image by the projection system can be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, wherein the projection system comprises a projection device, an image capturing device, and a determination module, wherein
    the projection device is configured to project a plurality of display grid points;
    the image capturing device is configured to capture images of the plurality of display grid points to obtain a plurality of captured images corresponding to the plurality of display grid points; and
    the determination module is coupled to the projection device and the image capturing device, the determination module is configured to receive the plurality of captured images, determine whether the plurality of captured images comprise at least one overexposing captured image with excessive brightness, and control the projection device not to project at least one unrecognizable display grid point corresponding to the at least one overexposing captured image when determining that the plurality of captured images comprise the at least one overexposing captured image,
    wherein when the projection system is started, the projection device adjusts grayscale values of the plurality of display grid points and projects the plurality of display grid points,
    the determination module treats a grayscale value corresponding to the at least one overexposing captured image with a minimum number as an operation grayscale value when determining the at least one overexposing captured image with the minimum number,
    wherein the projection device projects a plurality of display grid points with the operation grayscale value.

2. The projection system according to claim 1, wherein
the plurality of display grid points are divided into a plurality of display grid point rows;
the projection device projects the plurality of display grid point rows sequentially;
the plurality of display grid points are divided into a plurality of display grid point columns; and
the projection device projects the plurality of display grid point columns sequentially.

3. The projection system according to claim 2, wherein the image capturing device captures the plurality of display grid point rows and the plurality of display grid point columns sequentially to obtain the plurality of captured images corresponding to the plurality of display grid points.

4. The projection system according to claim 1, wherein the determination module selects at least one positioning grid point from the display grid points other than the at least one unrecognizable display grid point, wherein the at least one positioning grid point is used to position a projection range or a position of the projection device.

5. The projection system according to claim 1, further comprising:
a projection screen, comprising a viewing surface and a projection surface opposite to the viewing surface, wherein the projection device projects the plurality of display grid points on the projection surface, wherein the image capturing device obtains the plurality of captured images on the projection surface.

6. The projection system according to claim 1, wherein the determination module defines an unrecognizable display region of the projection device according to the at least one overexposing captured image and controls the projection device to project predetermined display grid points with a predetermined grayscale value in the unrecognizable display region.

7. A positioning method, applied to a projection system comprising a projection device and an image capturing device, the positioning method comprising:
projecting a plurality of display grid points by the projection device;
capturing images of the plurality of display grid points to obtain a plurality of captured images corresponding to the plurality of display grid points by the image capturing device;
determining whether the plurality of captured images comprise at least one overexposing captured image with excessive brightness and controlling the projection device not to project at least one unrecognizable display grid point corresponding to the at least one overexposing captured image when the plurality of captured images are determined to comprise the at least one overexposing captured image;
when the projection system is started, adjusting, by the projection device, grayscale values of the plurality of display grid points and projecting the plurality of display grid points; and
treating a grayscale value corresponding to the at least one overexposing captured image with a minimum number as an operation grayscale value when determining the at least one overexposing captured image with the minimum number, and
wherein the step of projecting the plurality of display grid points comprises:
projecting a plurality of display grid points with the operation grayscale value.

8. The positioning method according to claim 7, wherein the step of projecting the plurality of display grid points comprises:
dividing the plurality of display grid points into a plurality of display grid point rows;
projecting, by the projection device, the plurality of display grid point rows sequentially;
dividing the plurality of display grid points into a plurality of display grid point columns; and
projecting, by the projection device, the plurality of display grid point columns sequentially.

9. The positioning method according to claim 8, wherein the step of capturing the images of the plurality of display grid points to obtain the plurality of captured images corresponding to the plurality of display grid points comprises:
capturing the plurality of display grid point rows and the plurality of display grid point columns sequentially to obtain the plurality of captured images corresponding to the plurality of display grid points.

10. The positioning method according to claim 7, further comprising:
selecting at least one positioning grid point from the display grid points other than the at least one unrecognizable display grid point, wherein the at least one positioning grid point is used to position a projection range or a position of the projection device.

11. The positioning method according to claim 7, wherein the projection system further comprises a projection screen, wherein the projection screen comprises a viewing surface and a projection surface opposite to the viewing surface, wherein the step of projecting the plurality of display grid points comprises:
projecting the plurality of display grid points on the projection surface by the projection device.

12. The positioning method according to claim 11, wherein the step of capturing the images of the plurality of display grid points to obtain the plurality of captured images corresponding to the plurality of display grid points comprises:
obtaining the plurality of captured images on the projection surface by the image capturing device.

13. The positioning method according to claim 7, further comprising:
defining an unrecognizable display region of the projection device according to the at least one overexposing captured image and controlling the projection device to project predetermined display grid points with a predetermined grayscale value in the unrecognizable display region.

14. A projection system, comprising:
a projection device, configured to project a plurality of display grid points and comprising an image capturing device and a determination module, wherein
the image capturing device is configured to capture images of the plurality of display grid points to obtain a plurality of captured images corresponding to the plurality of display grid points; and
the determination module is electrically coupled to the image capturing device, and the determination module is configured to receive the plurality of captured images, determine whether the plurality of captured images comprise at least one overexposing captured image with excessive brightness, and control the projection device not to project at least one unrecognizable display grid point corresponding to the at least one overexposing captured image when determining that the plurality of captured images comprise the at least one overexposing captured image, wherein when the projection system is started, the projection device adjusts grayscale values of the plurality of display grid points and projects the plurality of display grid points, the determination module treats a grayscale value corresponding to the at least one overexposing captured image with a minimum number as an operation grayscale value when determining the at least one overexposing captured image with the minimum number, wherein the projection device projects a plurality of display grid points with the operation grayscale value.

15. A positioning method, applied to a projection system comprising a projection device and an image capturing device, the positioning method comprising:

projecting a plurality of display grid points by the projection device;

capturing images of the plurality of display grid points to obtain a plurality of captured images corresponding to the plurality of display grid points by the image capturing device; and determining whether the plurality of captured images comprise at least one overexposing captured image with excessive brightness and controlling the projection device not to project at least one unrecognizable display grid point corresponding to the at least one overexposing captured image when the plurality of captured images are determined to comprise the at least one overexposing captured image, wherein the step of projecting the plurality of display grid points comprises:

dividing the plurality of display grid points into a plurality of display grid point rows;

projecting, by the projection device, the plurality of display grid point rows sequentially;

dividing the plurality of display grid points into a plurality of display grid point columns; and projecting, by the projection device, the plurality of display grid point columns sequentially.

* * * * *